United States Patent
Kilambi et al.

(10) Patent No.: US 10,932,261 B2
(45) Date of Patent: Feb. 23, 2021

(54) MULTI-BAND TRANSMITTER SYSTEM INCORPORATING A MULTI-BAND SYNTHESIZER

(71) Applicant: Huawei Technologies Co., Ltd., Shenzhen (CN)

(72) Inventors: Sai Mohan Kilambi, Nepean (CA); Lan Hu, Nepean (CA); Andrei Buliga, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 15/147,372

(22) Filed: May 5, 2016

(65) Prior Publication Data

US 2017/0325228 A1  Nov. 9, 2017

(51) Int. Cl.
*H04W 72/04* (2009.01)
*H04L 5/00* (2006.01)

(52) U.S. Cl.
CPC ....... *H04W 72/0453* (2013.01); *H04L 5/0048* (2013.01)

(58) Field of Classification Search
CPC .......... H04W 72/0453; H04L 5/0048
See application file for complete search history.

(56) References Cited

U.S. PATENT DOCUMENTS

| | | | |
|---|---|---|---|
| 8,068,795 B2 | 11/2011 | Bavisi et al. | |
| 2002/0048325 A1 | 4/2002 | Takahiko | |
| 2003/0016701 A1* | 1/2003 | Hinson | H04B 1/0003 370/480 |
| 2003/0119444 A1* | 6/2003 | Yamaguchi | H04B 1/70735 455/21 |
| 2004/0192229 A1* | 9/2004 | Morris | H04B 1/0483 455/91 |
| 2005/0266841 A1* | 12/2005 | Lee | H04W 88/08 455/423 |
| 2007/0140392 A1 | 6/2007 | Cha et al. | |
| 2008/0220730 A1* | 9/2008 | Borremans | H04H 20/22 455/101 |
| 2012/0083229 A1* | 4/2012 | Kenington | H04B 1/0483 455/114.3 |
| 2012/0106657 A1* | 5/2012 | Fischer | H04B 7/2606 375/259 |
| 2013/0241757 A1* | 9/2013 | Morris | H04B 1/0007 341/144 |
| 2013/0288612 A1* | 10/2013 | Afsahi | H03F 1/0222 455/73 |

(Continued)

FOREIGN PATENT DOCUMENTS

| | | |
|---|---|---|
| JP | 2002111760 A | 4/2002 |
| KR | 20050011764 A | 1/2005 |
| WO | 2014025579 A1 | 2/2014 |

OTHER PUBLICATIONS

International Search Report for corresponding International Appl. No. PCT/CN2017/080309 dated Jul. 5, 2017.

*Primary Examiner* — Un C Cho
*Assistant Examiner* — Yu-Wen Chang

(57) ABSTRACT

A multi-band synthesizer generates a multi-band signal for transmission. The multi-band signal comprises a plurality of band signals each comprising one or more channel signals. The channel signals to be included in a particular band signal are specified in control signals, allowing the channels included in a band to be easily changed.

13 Claims, 5 Drawing Sheets

(56) References Cited

U.S. PATENT DOCUMENTS

| | | | | |
|---|---|---|---|---|
| 2013/0308591 A1* | 11/2013 | Mashino | .............. | H04L 5/0007 370/329 |
| 2014/0044155 A1* | 2/2014 | Honcharenko | ...... | H04B 1/0007 375/219 |
| 2014/0119281 A1* | 5/2014 | Kummetz | ......... | H04W 72/0453 370/328 |
| 2015/0016441 A1* | 1/2015 | Hanson | ................ | H04W 16/02 370/338 |
| 2015/0304146 A1* | 10/2015 | Yang | .................... | H04L 5/0066 370/329 |
| 2016/0192374 A1* | 6/2016 | Negus | ................ | H04W 72/082 370/280 |
| 2016/0352543 A1* | 12/2016 | Hu | .................... | H04L 25/03343 |

* cited by examiner

MULTI-BAND TRANSMITTER SYSTEM INCORPORATING A MULTI-BAND SYNTHESIZER

TECHNICAL FIELD

The current disclosure relates to multi-band transmitters and in particular to generating multi-band signals for transmission.

BACKGROUND

In order to support the increasing bandwidth demands on cellular networks, network providers may use multi-band transmission techniques. Multi-band transmission uses a plurality of different bands, or frequency ranges, to transmit data. Each band may carry a plurality of individual data signals or channels and may be transmitted by a respective transmitter.

Techniques exist for adjusting a frequency range at which a band signal is transmitted. However, it is desirable to have an additional, alternative and/or improved multi-band transmitter system that provides flexibility in generating the multi-band signals.

SUMMARY

In accordance with the present disclosure there is provided, according to a first aspect, a multi-band transmission system comprising a channel tuner and a multi-band synthesizer. The channel tunner is for frequency shifting a plurality of channel streams according to at least one band membership control signal indicating one or more of the channel streams to be combined together into respective band signals, the channel tuner outputting a plurality of intermediate frequency (IF) channel streams each corresponding to a respective channel stream. The multi-band synthesizer is for generating a plurality of band signals and includes a plurality of band synthesizers, each comprising a signal combiner for selectively combining a subset of the plurality of IF channel streams output from the channel tuner into a respective band signal according to the at least one band membership control signal provided to the band synthesizer indicating one or more of the plurality of IF channel streams to combine into the band signal.

In a further embodiment of the multi band synthesizer, each of the band synthesizers further comprises a plurality of multipliers, each of the multipliers associated with a respective one of the plurality of IF channel inputs, each of the multipliers for applying a selected gain factor to each of the IF channel streams, the gain factor selected from a plurality of gain factors based on a number of IF channel streams combined together into the respective band signal.

In a further embodiment of the multi-band synthesizer, the band membership control signal provided to each of the band synthesizers comprises a multi-bit signal, with each bit providing an indication for combining or omitting an associated IF channel stream from the respective band signal.

In a further embodiment of the multi-band synthesizer, wherein the signal combiner of one or more of the plurality of band synthesizers comprises a plurality of cascaded multiplexers, each of the multiplexers controlled by a respective bit of the band membership control signal, outputting a signal selected from an output of a previous one of the cascaded multiplexers and the output of the previous one of the cascaded multiplexers added to an IF channel stream associated with the multiplexer, wherein the first multiplexer of the cascaded multiplexers selects a signal from null signal and an IF channel stream associated with the first multiplexer.

In accordance with yet another embodiment of the present disclosure there is provided a multi-band transmission system comprising: a channel tuner for frequency shifting a plurality of channel streams according to at least one band membership control signal indicating one or more of the channel streams to be combined together into respective band signals, the channel tuner outputting a plurality of intermediate frequency (IF) channel streams each corresponding to a respective channel stream; and a multi-band synthesizer for generating a plurality of band signals, the multi-band synthesizer comprising: a plurality of band synthesizers, each comprising a signal combiner for selectively combining a subset of the plurality of IF channel streams output from the channel tuner into a respective band signal according to the at least one band membership control signal provided to the band synthesizer indicating one or more of the plurality of IF channel streams to combine into the band signal.

In a further embodiment the multi-band transmission system further comprises a plurality of channel processors each comprising a respective channelization filter, the plurality of channel processors generating the channel streams from corresponding data streams.

In a further embodiment the multi-band transmission system further comprises a multi-channel processor for generating the channel streams from corresponding data streams, the multi-channel processor comprising: a channel combiner for combing the data streams into a combined data stream; a channelization filter for generating a combined channel stream from the combined data stream; and a channel stream de-merger for generating the individual channel streams from the combined channel stream.

In a further embodiment of the multi-band synthesizer, wherein the multi-channel processor further comprises an up-converter for increasing a frequency of at least one of the data streams, the combined data stream, the combined channel stream and the individual channel streams.

In a further embodiment the multi-band transmission system further comprises a plurality of band processors each associated with a respective one of the plurality of band signals, each of the plurality of band processors for generating a respective radio frequency (RF) band signal corresponding to the associated band signal.

In a further embodiment the multi-band transmission system further comprises an adder for combining the plurality of RF band signals together into a combined RF band signal.

In a further embodiment the multi-band transmission system further comprises a digital to analog converter for generating an analog transmission signal corresponding to the combined RF band signal for driving a transmission antenna.

In a further embodiment of the multi-band synthesizer, wherein each of the band synthesizers further comprise a plurality of multipliers each associated with a respective one of the plurality of IF channel inputs for applying a selected gain factor to each of the IF channel streams, the gain factor selected from a plurality of possible gain factors based on a number of IF channel streams combined together into the respective band signal.

In a further embodiment of the multi-band synthesizer, wherein the band membership control signal provided to each of the band synthesizers comprises a multi-bit signal, with each bit providing an indication of whether an associated IF channel stream is to be combined in the respective band signal.

In a further embodiment of the multi-band synthesizer, wherein the signal combiner of one or more band synthesizers comprises a plurality of cascaded multiplexers, each of the multiplexers controlled by a respective bit of the band membership control signal, outputting a signal selected from an output of a previous one of the cascaded multiplexers and the output of the previous one of the cascaded multiplexers added to an IF channel stream associated with the multiplexer, wherein the first multiplexer of the cascaded multiplexers selects a signal from an null signal and an IF channel stream associated with the first multiplexer.

In accordance with yet another embodiment of the present disclosure there is provided a method for use in a multi-band transmission system, the method comprising: receiving at least one band member control signal indicating one or more of the plurality of intermediate frequency (IF) channel streams to be combined together into respective ones of a plurality of band signals; and combining the plurality of IF channel streams into the plurality of band signals according to the at least one band member control signal.

In a further embodiment the method further comprises: generating the plurality of IF channel streams each corresponding to a respective one of a plurality of channel streams by frequency shifting one or more of the plurality of channel streams according to band member control signals indicating one or more of the plurality of channel streams to be combined together into respective ones of a plurality of band signals.

In a further embodiment the method further comprises: generating the plurality of channel streams from a plurality of data streams, each one of the plurality of channel streams corresponding to a respective one of the plurality of data streams.

In a further embodiment of the method, wherein generating the plurality of channel streams comprises applying a channelization filter to each of the plurality of data streams.

In a further embodiment of the method, wherein generating the plurality of channel streams comprises: combining the plurality of data streams into a combined data stream; applying a channelization filter to the combined data stream to generate a combined channel stream; and separating the combined channel stream into the plurality of channel streams.

In a further embodiment the method further comprises: generating a plurality of radio frequency (RF) band signals from the plurality of band signals; and combining the plurality of RF band signals into a combined RF band signal.

BRIEF DESCRIPTION OF THE DRAWINGS

Embodiments are described herein with reference to the appended drawings, in which.

DETAILED DESCRIPTION

As bandwidth demands increase, techniques for providing the bandwidth are required. Multi-band transmission techniques may be used to supply increased bandwidth by transmitting data over multiple different bands or frequency ranges. The multi-band transmission may be used in cellular networks such as TD-CDMA, GSM, LTE, LTE-A, or LTE-M networks. Multiple different transmitters may be used to provide multi-band transmission systems. However, using separate transmitter systems for each of the different bands is expensive, both in terms of expense and power requirements. Multi-band transmitter systems may combine a number of pre-defined channels together to provide the signals for transmission on the different bands. However, such systems are inflexible in terms of what channels are combined into the different bands. The multi-band transmitter system described further herein allows arbitrary channels to be combined together into a plurality of band signals. The individual band signals may then be digitally up-converted to target any particular band and transmitter. The up-converted band signals may be combined together for transmission via a single transmitter. The multi-band transmitter system described further below provides a highly flexible transmitter that allows software-defined configuring, or re-configuring, of what channels are combined into different bands. The transmitter architecture also provides simple path for adding additional bands to the transmitter system.

Figure 1:
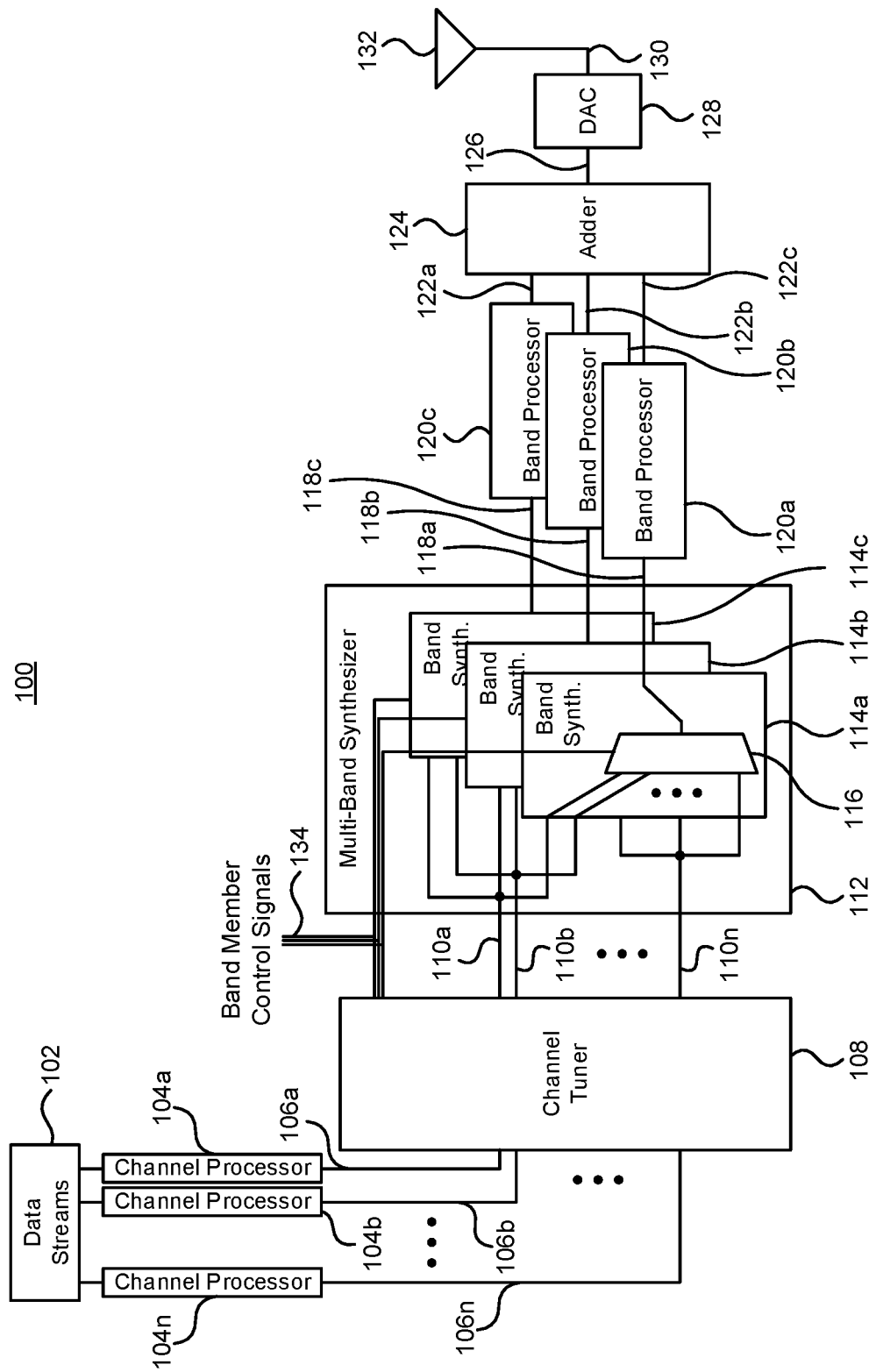
FIG. 1 depicts a multi-band transmitter system.

FIG. 1 depicts a multi-band transmitter system. The multi-band transmitter system 100 may receive a plurality of data streams 102 that are each processed by respective channel processors 104a, 104b, 104n (referred to collectively as channel stream processors 104). Each of the channel stream processors 104 may provide a channel filter as well as an up-converter for up-converting the data signal to a higher processing frequency of subsequent processing components. Each of the channel stream processors 104 receive a data stream and provide a corresponding channel stream 106a, 106b, 106n (referred to collectively as channel streams 106). As described further below with reference to FIG. 3, it is possible to use a single channel processor to process a plurality of data streams that have been combined together.

The channel streams 106 are processed by a channel tuner 108 to generate corresponding intermediate frequency (IF) channel streams 110a, 110b, 110n (referred to collectively as IF channel streams 110). The IF channel streams 110 are combined together by a multi-band synthesizer 112 to generate a plurality of band signals 118a, 118b, 118c (referred to collectively as band signals 118). The band signals 118 may be processed by respective band processors 120a, 120b, 120c (referred to collectively as band processors 120) that generate radio frequency (RF) band signals 122a, 122b, 122c (referred to collectively as RF band signals 122) at the appropriate band frequencies. The RF band signals 122 may be combined together by an adder 124 to generate a combined RF band signal 126. The combined RF band signal 126 may be processed by a digital to analog converter (DAC) 128 to generate a driving signal 130 that drives an antenna 132 for radiating the combined RF band signal 126 into free space. Alternatively, it is possible for each of the RF band signals 122 to be processed by respective DACs to generate a plurality of driving signals driving a plurality of antennas.

The number of data streams 102 in the multi-band transmitter system 100 may vary. As an example, a multi-band transmitter may receive 10 data streams 102 which can be processed into three different band signals. It will be appreciated that the particular number of data streams 102 and the number of bands can vary. The particular individual data streams 102, or more particularly the corresponding IF channel streams 110, to be combined together into the different band signals may be specified by band member control signals 134. The band member control signals 134 indicate one or more of the plurality of IF channel streams 110 to be combined together into each of the band signals 118. Table 1 depicts illustrative band membership 6 channel streams combined into 3 different band signals. The band membership control signals 104 may be provided as an n-bit signal for each of the different bands, where n is the number of channel streams. For example, for the channel to band assignment depicted in Table 1, the band membership control signals may be:
Band 1=110000
Band 2=001001
Band 3=000110

TABLE 1

Band membership of channel streams

|        | Channel 1 | Channel 2 | Channel 3 | Channel 4 | Channel 5 | Channel 6 |
|--------|-----------|-----------|-----------|-----------|-----------|-----------|
| Band 1 | 1         | 1         | 0         | 0         | 0         | 0         |
| Band 2 | 0         | 0         | 1         | 0         | 0         | 1         |
| Band 3 | 0         | 0         | 0         | 1         | 1         | 0         |

Prior to being combined into the band signals 118, the individual data streams 102 may each be processed by respective channel stream processors 104a, 104b, 104n (referred to collectively as channel stream processors 104) to generate the corresponding channel streams 106. Each of the channel stream processors 104 may provide a channel filter as well as an up-converter for up-converting the signal to a higher processing frequency of subsequent processing components.

The channel tuner 108 receives the band member control signals 134 and tunes the individual channel streams 106 according to what channel streams will be combined together. The band member control signals 134 provide an indication of the one or more IF channel streams, which correspond to the channel streams 106, to be combined together. Channel streams 106 that will be combined together into a single band signal may be frequency shifted so that the individual signals will not overlap with each other when combined. For example, if 3 channel streams will be combined together into a band signal, one channel stream may remain un-shifted, a second channel stream may be shifted down by an amount sufficient to avoid overlap with the other channels being combined, and a third channel stream may be shifted up an amount sufficient to avoid overlap with the other channels being combined by the channel tuner 108. The channel tuner 108 provides IF channel streams 110 that correspond to the appropriately shifted channel streams 106.

The band member control signals 134 are also provided to a multiband synthesizer 112 that combines the IF channel streams 110 into the band signals 118 according to the band member control signals 134. That is, the band member control signals 134 indicate what IF channel streams will be members of, or combined into, a particular one of the band signals 118. The multi-band synthesizer 112 comprises a plurality of individual band synthesizers 114a, 114b, 114c (referred to collectively as band synthesizers 114). Although the individual band synthesisers 114 are described as each providing a single signal 118, it is possible for the individual band signals to cover a plurality of transmission bands, or frequency ranges, used in cellular communication systems. Regardless of the number of transmission bands that it covers, the signals provided by the individual band synthesizers are described as a single band signal. Each of the band synthesizers 114 are coupled to a plurality of IF channel inputs that receive the IF channel streams 110. As depicted in FIG. 1, each of the band synthesizers 114 may be coupled to all of the IF channel inputs so that all of the band synthesizers 114 receive the same IF channel streams 110. However, not all band synthesizers 114 need to be coupled to all of the IF channel inputs. As an example, a first IF channel stream may always be combined into the first band signal, and as such only the band synthesizer that generates the first band signal needs to be coupled to the IF channel input receiving the first IF channel stream. Reducing the number of band synthesizers 114 that an IF channel stream is received at will reduce the flexibility of the system since the different bands that the IF channel stream could be combined into is reduced; however, the reduced flexibility may be acceptable or desired in some applications.

Each of the band synthesizers 114 combine a subset of the IF channel streams received at the IF channel inputs into a single band signal 118 as indicated in band member control signals 134. Each IF channel stream may be included in a single band signal, or one or more of the IF channel streams may be duplicated in two or more band signals. Although the band member control signals 134 may be provided in numerous different ways, the band member control signals are depicted as separate multi-bit signals associated with each of the band synthesizers 114. Details of the band synthesizer 114a is depicted in FIG. 1. Although details of only one of the band synthesizers 114 is depicted it will be appreciated that the remaining band synthesizers 114 may be provided by a similar structure. The band synthesizer 114a comprises a combiner 116 that selectively combines a subset of the IF channel streams 110 received at the IF channel inputs into a respective band signal 118a. The IF channel streams that the combiner 116 combines into the band signal 118a are indicated by the associated band member control signal 134.

The individual band signals 118 each comprise one or more IF channel streams combined together. However, the band signals 118 are not at the appropriate frequency for transmission. Each of the band signals 118 is processed by a corresponding band processor 120a, 120b, 120c (referred to collectively as band processors 120) to generate the appropriate radio frequency (RF) band signals 122a, 122b, 122c (referred to collectively as RF band signals 122). The RF band signals 122 are depicted as being combined together at an adder 124. Each of the RF band signals 122 will be at different RF frequency bands and as such should not substantially overlap with each other. The adder 124 combines the RF band signals 122 together into a single combined RF band signal 126, which is supplied to a digital to analog converter 128 to produce an analog RF signal 130 that can drive a transmission antenna 132. Although depicted as being combined into a single combined RF band signal 126, it is possible for one or more of the RF band signals 122 to be combined together into separate signals, or be used individually in driving an antenna.

The system 100 provides a flexible and configurable architecture for multi-band transmissions. It is possible to control which channels are combined into which bands by simply providing different control signals. So for example, if a bandwidth of a particular transmission band is increased it is relatively simple to reconfigure the system 100 to combine additional channels into the larger band to make use of the additional bandwidth. The system 100 described above provides for the arbitrary combining of data streams to form multiple band signals that can be digitally up-converted to target any band combination. The up-converted band signals can be combined together for transmission via a single transmitter. The system 100 may be used to provide configurable and scalable base stations for use in various wireless networks such as GSM, TD-CDMA, LTE, LTE-A, and LTE-M as well as future standards.

Figure 2:
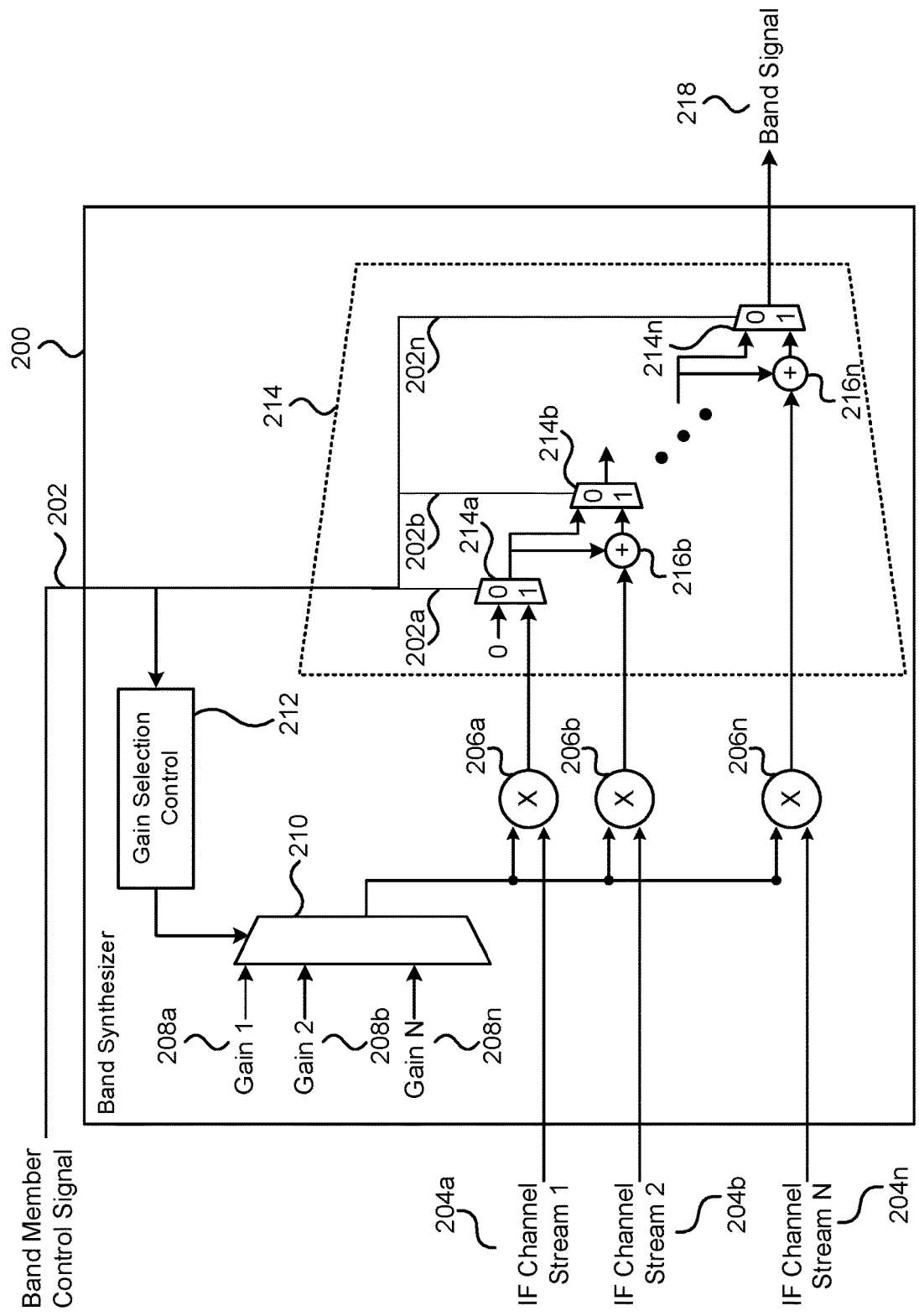
FIG. 2 depicts details of a band synthesizer.

FIG. 2 depicts details of a band synthesizer. The band synthesizer 200 may be used to provide the individual band synthesizers 114 described above with reference to FIG. 1. The synthesizer receives an associated band member control signal 202 and IF channel streams 204a, 204b, 204n (referred to collectively as IF channel stream 204). The band synthesizer 200 combines the IF channel streams 204 into a single band signal 218 according to the band member control signal 202. In addition to combining the IF channel streams 204 together, the band synthesizer may also apply gain control to the IF channel signals 204 in order to reduce a total power of the resulting band signal 218. The gain control is depicted as being provided by a plurality of signal multipliers 206a, 206b, 206n (referred to collectively as multipliers 206) that multiply a respective one of the IF channel stream by a selected gain factor. The same gain factor is used for each of the multipliers 206. The gain factor may be selected from a plurality of gain factors 208a, 208b, 208n (referred to collectively as gain factors 208). The appropriate gain factor may be selected by a selector 210, which could be implemented as a multiplexor. The selector 210 may be controlled by a signal, or signals, received from a gain selection controller 212. The gain selection controller determines the appropriate one of the plurality of gain factors 208 to select based on the received band member control signal 202. The gain factor that is selected may be based on the number of channels being combined together into the band signal. For example, if only a single channel is being combined into the band signal the gain factor 208a may be selected, which may result in no gain being applied to the IF channel streams. At the other extreme, if all N channel streams are being combined together, gain factor 208n may be selected which may result in a gain factor of, for example, 1/n, being applied to each of the IF channel streams 204.

The gain-adjusted IF channel streams 204 output from the multipliers 206 are provided to a combiner 214 that combines the IF channel streams 204 together according to the band member control signal 202. As depicted, the band member control signal 202 may be a multi-bit signal 202a, 202b, 202n with a bit associated with each of the IF channel streams 204. For example, the bit signal 202a provides an indication of whether or not the IF channel stream 204a should be included in the band signal 218, the bit signal 202b provides an indication of whether or not the IF channel stream 204b should be included in the band signal 218, and the bit signal 202n provides an indication of whether or not the IF channel stream 204n should be included in the band signal 218. The particular value used to indicate whether or not the associated IF channel stream should be included may vary; however, in FIG. 2 a value of '0' indicates that the IF channel stream should not be included while a value of '1' indicates that the IF channel stream should be included. The combiner 214 may be provided as a cascaded series of selectors 214a, 214b, 214n (referred to collectively as selectors 214). Each of the selectors 214 select from one of two possible inputs. The first input is an output from the previous selector and the second input is the combination of the output from the previous selector and the associated IF channel stream. As depicted, adders 216b, 216n (referred to collectively as adders 216) are provided for combining the associated IF channel stream with the output from the previous selector. The first selector 214a in the cascade selects from the associated IF channel stream, which is depicted as the first IF channel stream 204a, and no signal depicted as '0'. Accordingly, each of the selectors 214 select whether or not the associated IF channel stream should be added to the band signal. The final selector 214n provides the band signal, which will include the gain-corrected IF channel streams 204 that were indicated in the band member control signal 202 as being included in the band signal 218. The band synthesizer 200 provides a relatively simple circuit that can be implemented using a field programmable gate array (FPGA), application specific integrated circuit (ASIC), microcontroller, or other computing systems.

Figure 3:
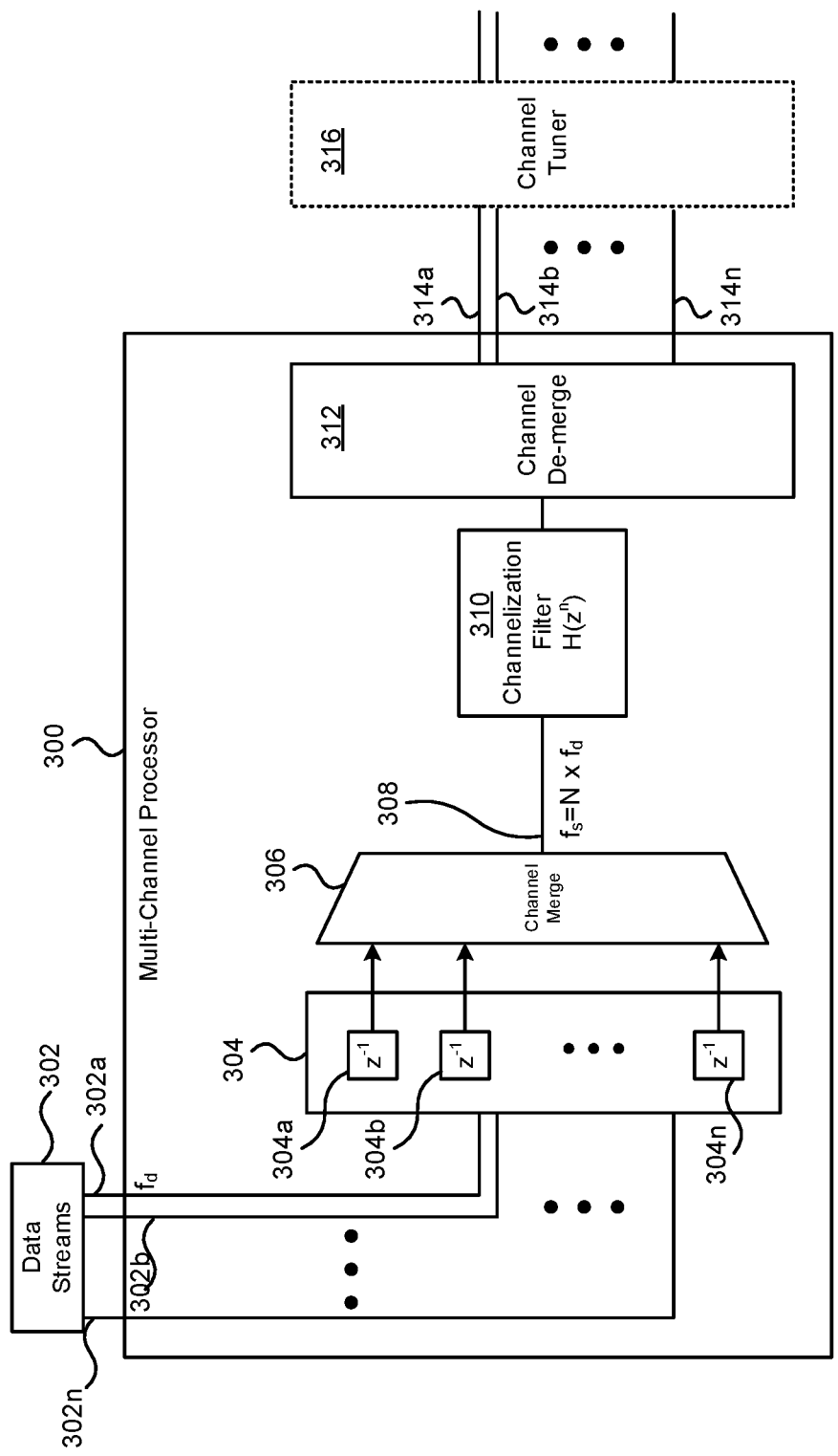
FIG. 3 depicts details of a multi-channel processor.

FIG. 3 depicts details of a multi-channel processor. The multi-channel processor 300 processes a plurality of data streams 302a, 302b, 302n (referred to collectively as data streams 302) and generates a plurality of channel streams 314a, 314b, 314n (referred to collectively as channel streams 314). The multi-channel processor 300 may used in place of the plurality of individual channel processors 104 described above with reference to FIG. 1. Rather than processing each data stream individually as described above, the multi-channel processor 300 merges the data streams 302 together into a single multi-data stream. The multi-channel processor 300 may use a higher clock rate, for example of an FPGA implementing the multi-channel processor 300, to interleave multiple data streams into a single path. Such clock folding eliminates the need for multiple channel processors to process each of the data streams 302. The data streams 302 are depicted as having a frequency of $f_d$. The multi-channel processor 300 receives a plurality of data streams 302, combines them together for processing and then separates the processed stream into individual channel streams 314a, 314b, 314n. The multi-channel processor 300 has an up-converter 304 provided by a plurality of individual up-converters 304a, 304b, 304n, that first up-converts each of the individual data streams 302. The individual data streams 302 may be up-converted from an initial frequency of, for example, $f_d$, to an up converted frequency of, for example, $f_s=12 \cdot f_d$, assuming 12 or fewer data streams are combined together. The up-conversion may increase the frequency by a multiple of at least the number of streams being combined together. For example, if 12 data streams 302 are combined together, the frequency may be up-converted to $f_s=12 \cdot f_d$. The frequency up-conversion may be accomplished using half-band filtering by a series of cascaded half-band filters. For example, the conversion may be accomplished by up-converting by 2, up-converting by 2 again, and finally up-converting by 3. The up-converted data streams may be combined together by a combiner 306 that combines samples or values from each of the up-converted data samples one after the other. The up converted data streams may be combined together in a time-division fashion wherein symbols or values of the plurality of up converted data streams are combined one after the other into the single multi-data stream 308. The single multi-data stream 308 may then be processed by a channelization filter 310, which may be a filter having a relatively large number of coefficients. For example, the channelization filter may comprise between 50 to 100 coefficients, or more particularly about 80 coefficients. The channelization filter 310 generates an up-converted multi-channel stream. The up-converted multi-channel stream is processed by a channel de-merger 312 that separates the combined channel stream into the individual channel streams 314. The individual channel streams 314 may be at the higher frequency of $f_s$. The channel streams 314 may then be processed by a channel tuner 316, which may be channel tuner 108 as described above with reference to FIG. 1.

The multi-channel processor 300 described above, combine the multiple data streams into a single stream for processing by a channel filter and then separated back into individual channel streams. Although first combining the data streams and then de-merging the individual channel streams adds additional processing, substantial processing savings may be realized by only requiring a single channelization filter 406 rather than a channelization filter for each data stream.

Figure 4:
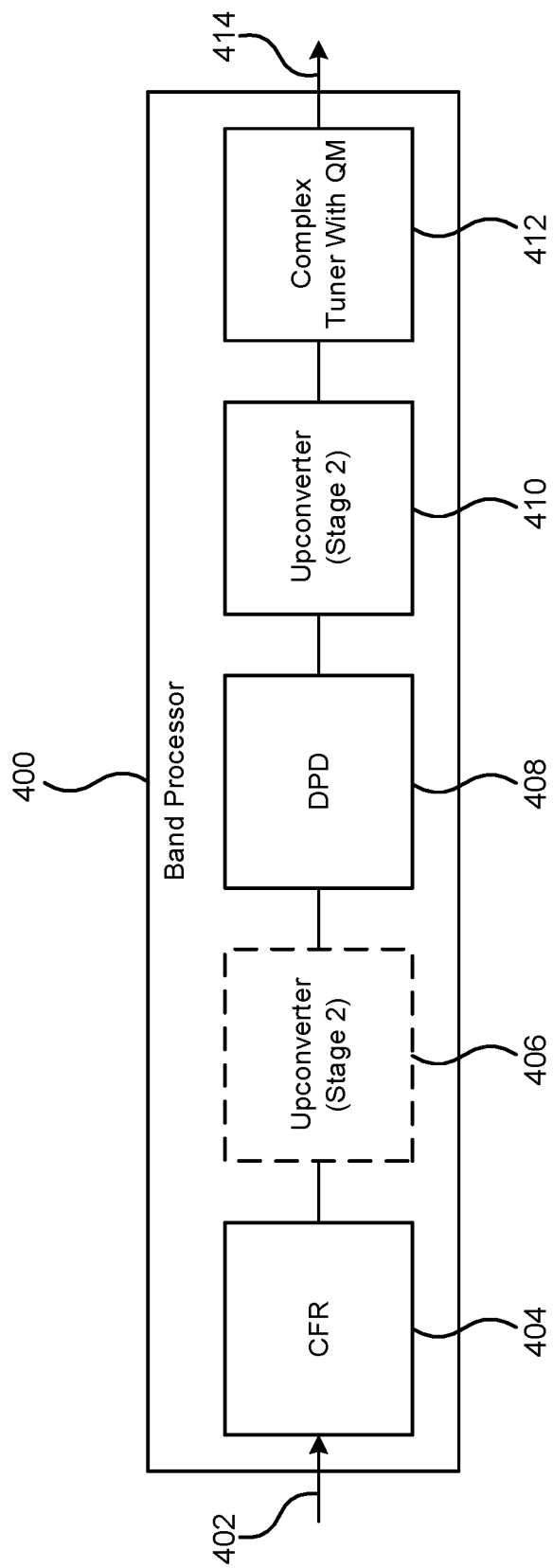
FIG. 4 depicts details of a band processor.

FIG. 4 depicts details of a band processor. The band processor 400 may be used as each of the band processors 120 described above. The band processor 400 receives an IF channel stream 402 and generates a corresponding RF band signal 414. The IF channel stream 402 is processed by a processing chain in order to generate the RF band signal at a particular band frequency. The processing chain may comprise a crest factor reduction (CFR) component 404 that performs crest factor reduction on the channel filter. The processing chain may further comprise one or more up-converters 406, 410 in the processing chain in order to up-convert the channel stream to a higher frequency that a subsequent digital to analog converter operates at. For example, the up-conversion may convert the stream to a frequency of $f_{dac}=8 \cdot f_s$. The processing chain may further comprise a digital pre-distortion (DPD) component 408 that applies pre-distortion to the signals to compensate for non-ideal characteristics in the transmitter path. A complex tuner component 412 may process the up-converted stage using quadrature modulation or other appropriate techniques. Quadrature modulation may be used to convert complex samples to real samples, allowing the use of a real DAC instead of a complex DAC. The complex tuner component 410 may be provided by a plurality of individual complex multipliers, or CORDIC tuners if storage is limited. For example, as described above, if the up-conversion up-converts the frequency by a factor of 8, the complex tuner may comprise 8 CORDIC tuners. The band processor 400 generates an RF band signal at a transmission frequency of the particular band processor 400. The band processor may be implemented using an FPGA, ASIC, microprocessor or similar computing hardware.

Figure 5:
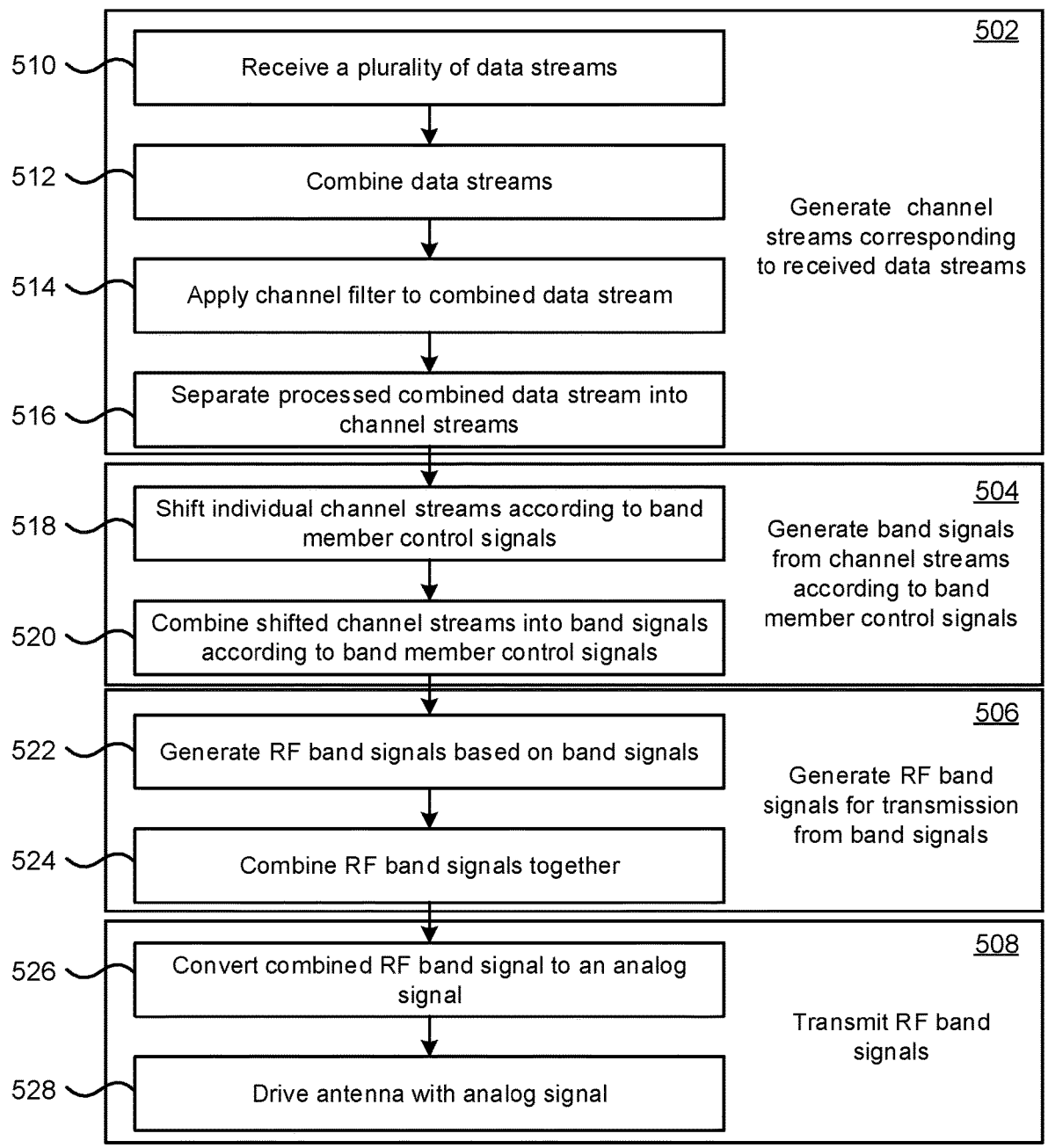
FIG. 5 is a flow chart of a method for generating a multi-band signal.

FIG. 5 is a flow chart 500 of a method for generating a multi-band signal. The method may be implemented by one or more hardware components such as FPGAs or ASICs. The method 500 includes generating a plurality of channel streams that correspond to a plurality of data streams (502). The generated channel streams are used in generating band signals according to band member control signals (504). The band member control signals provide an indication of which of the channel streams are to be combined together into particular band signals. RF band signals are generated from the band signals (506) and the RF signals are transmitted (508). Although various methods of achieving each of the above steps are possible, one particular implementation of each of the steps is depicted in further detail in FIG. 5.

In order to generate the channel streams, a plurality of data streams are received (510). Each data stream may comprise data for one or more particular end points, which could be for example end user equipment such as a mobile device. The data streams are combined together (512) and a channel filter is applied to the combined data stream (514). Computing resources associated with applying separate channel filters to each data stream can be avoided by combining the data streams together before applying the channel filter. Once the channel filter has been applied to the combined data stream the processed data stream is separated into individual channel streams (516). The individual channel streams would correspond to an individual data stream that has processed by an individual channel filter.

The band signals may be generated from the plurality of channel streams by frequency shifting individual channel streams according to the band member control signals (518). The frequency shifting of the signals ensures that the channel streams that will be combined together into a single band do not overlap, or at least only overlap an acceptable amount, with each other. Once the individual channel streams have been shifted, they are combined together according to the band member control signals to generate the band signals (520).

RF band signals for transmission may be generated by generating individual RF band signals for each band signal (522). An RF band signal corresponds to a band signal that has been shifted to the desired RF frequency band. Each RF band signal is associated with a different frequency range, which may correspond to one or more adjacent transmission bands. Since each RF band signal is associated with a different frequency range, the plurality of RF band signals can be combined together into a single multi-band RF signal (524).

The RF band signals may be transmitted by converting the combined multi-band RF band signal to an analog transmission signal (526). The analog conversion may be done by a digital to analog converter. The analog transmission signal may be further processed or conditioned, for example by amplifying and/or filtering, for transmission. The analog signal is used to drive an antenna (528) and radiate the analog signal into free space for reception by one or more receivers.

The multi-band transmitter system, components and methods described above may be used to provide a transmitters in cellular networks. The system may be used to provide transmitters in massive multiple input multiple output (MIMO) systems. As described above, a multi-band transmitter can be flexibly reconfigured to change channel to band assignments, which may allow for greater band utilization as narrow transmission bands are aggregated into large transmission bands. Further, additional transmission bands may be added to the transmitter system with relative ease by replicating the components associated with generating and processing a transmission band. Accordingly, the transmitter architecture described above may scale easily to accommodate additional transmission bands. The transmitter system provides a flexible multi-band transmitter that can be easily reconfigured, both regard to the number of bands used in the transmission as well as particular channels assigned to each band, to adjust to changing demands. The use of a single multi-band transmitter may provide advantages in terms of cost and/or energy consumption. Further, the techniques described above may provide a relatively memory-efficient process for generating the RF band signals, for example by sharing coefficients between multiple bands and by reducing a number of channelization filters required.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring of embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A multi-band transmission system comprising:
a channel tuner for (i) receiving a plurality of channel streams and a plurality of band membership control signals, wherein each band membership control signal indicates a respective subset of the plurality of channel streams that are to be combined into a respective digital band signal, and (ii) frequency shifting at least some of the plurality of channel streams according to the band membership control to output a plurality of intermediate frequency (IF) digital channel streams corresponding to the channel streams such that the IF digital channel streams that correspond to the channel streams that are to be combined into a respective digital band signal do not overlap; and
a multi-band transmitter comprising:
a multi-band synthesizer for generating the digital band signals, the multi-band synthesizer comprising:
a plurality of band synthesizers, each coupled to receive the plurality of IF digital channel streams and comprising a signal combiner configured to selectively combine a respective subset of the plurality of different IF digital channel streams and output a respective one of the digital band signals having a respective desired band based on a respective one of the band membership control signals; and
an adder being configured to combine the respective digital band signals output from corresponding band synthesizers and to output a digital multi-band radio frequency (RF) signal including the respective desired bands.

2. The multi-band transmission system of claim 1, further comprising a plurality of channel processors each comprising a respective channelization filter, the plurality of channel processors generating the channel streams from corresponding data streams.

3. The multi-band transmission system of claim 1, further comprising a multi-channel processor for generating the plurality of channel streams from corresponding data streams, the multi-channel processor comprising:
a channel combiner for combining the data streams into a combined data stream;
a channelization filter for generating a combined channel stream from the combined data stream; and
a channel stream de-merger for generating the plurality of channel streams from the combined channel stream.

4. The multi-band transmission system of claim 3, wherein the multi-channel processor further comprises at least one up-converter for increasing frequencies of at least one of the data streams.

5. The multi-band transmission system of claim 1, further comprising a plurality of band processors each associated with a respective one of the digital band signals, each of the plurality of band processors being configured to process a respective digital band signal and output a respective digital radio frequency (RF) band signal corresponding to the associated digital band signal.

6. The multi-band transmission system of claim 1, further comprising a digital to analog converter for generating an analog transmission signal corresponding to the digital multi-band RF signal for driving a transmission antenna.

7. The multi-band transmission system of claim 1, wherein each of the band synthesizers further comprise a plurality of multipliers each associated with a respective one of the plurality of IF channel inputs for applying a selected gain factor to a corresponding IF digital channel stream at the respective IF channel input, the gain factor selected from a plurality of possible gain factors based on a number of the subset of IF channel streams combined together into the respective digital band signal.

8. The multi-band transmission system of claim 1, wherein the band membership control signal provided to each of the band synthesizers comprises a multi-bit signal, with each bit providing an indication of whether an associated IF digital channel stream is to be combined to output the respective digital band signal.

9. The multi-band transmission system of claim 8, wherein the signal combiner of each band synthesizer comprises a plurality of cascaded multiplexers, each of the multiplexers controlled by a respective bit of the band membership control signal, a respective cascaded multiplexer being configured to output a signal that is selected from an output of a previous cascaded multiplexer and an output combining the output of the previous cascaded multiplexer and an IF digital channel stream associated with the respective cascaded multiplexer, wherein a first multiplexer of the cascaded multiplexers selects a signal from a null signal and an IF digital channel stream associated with the first multiplexer.

10. A method for implemented in a multi-band transmission system, the method comprising:
receiving a plurality of channel streams;
receiving a plurality of band membership control signals, each band member control signal indicating a respective subset of the channel streams to be combined together into a respective digital band signal;
frequency shifting at least some of the plurality of channel streams according to the band membership control signals to output a plurality of intermediate frequency (IF) digital channel streams corresponding to the channel streams such that the IF digital channel streams that correspond to the channel streams that are to be combined into a respective digital band signal do not overlap;
selectively combining respective subsets of the plurality of different IF digital channel streams to output respective digital band signals each having a respective desired band based on a respective one of the band membership control signals; and
combining the respective digital band signals to output a digital multi-band radio frequency (RF) signal including the respective desired bands.

11. The method of claim 10, further comprising generating the plurality of channel streams from a plurality of data streams, each one of the plurality of channel streams corresponding to a respective one of the plurality of data streams.

12. The method of claim 11, wherein generating the plurality of channel streams comprises applying a channelization filter to each of the plurality of data streams; and
   outputting the plurality of channel streams.

13. The method of claim 11, wherein generating the plurality of channel streams comprises:
   combining the plurality of data streams into a combined data stream;
   applying a channelization filter to the combined data stream to generate a combined channel stream; and
   separating the combined channel stream into the plurality of channel streams.

\* \* \* \* \*